United States Patent
Wu et al.

(10) Patent No.: US 7,152,196 B2
(45) Date of Patent: Dec. 19, 2006

(54) ADAPTIVE MULTI-MODE HARQ SYSTEM AND METHOD

(75) Inventors: Jianming Wu, Kanata (CA); Wen Tong, Ottawa (CA); Hang Zhang, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 527 days.

(21) Appl. No.: 10/247,286

(22) Filed: Sep. 20, 2002

(65) Prior Publication Data

US 2003/0110435 A1 Jun. 12, 2003

Related U.S. Application Data

(60) Provisional application No. 60/340,024, filed on Dec. 10, 2001, provisional application No. 60/342,946, filed on Dec. 21, 2001.

(51) Int. Cl.
*G08C 25/02* (2006.01)
*H04L 1/18* (2006.01)

(52) U.S. Cl. .................................. 714/748
(58) Field of Classification Search ........... 714/746, 714/748–750, 18; 370/338
See application file for complete search history.

(56) References Cited

U.S. PATENT DOCUMENTS 6,542,490 B1* 4/2003 Ahmadvand et al. ....... 370/338

OTHER PUBLICATIONS

Habib Djandji, An efficient hybrid ARQ protocol for point-to-multipoint communication and its throughput performance, Sep. 1999, IEEE Trans. on Vehicular Tech., vol. 48, No. 5, p. 1688-1698.*

Wei et al., A new selective retransmitted ARQ system, 1993, IEEE, p. 1815-1821.*

Miller et al., the analysis of some selective-repeat ARQ schemes with finite receiver buffer, Sep. 1981, IEEE Trans on Comm., Vo Com-29, No. 29, p. 1307-1315.*

A.R.K. Sastry, Improving automatic repeat request (ARQ) performance on satellite channel under high error rate conditions, Apr. 1975, IEEE Trans. on Comm. p. 436-439.*

Li et al., Performance of the radio link protocol of HIPERLAN/2, 2000, IEEE, p. 1444-1448.*

Li et al., Performance comparsion of the radio link protocols of IEEE 802.11a and HIPERLAN/2, 2000, IEEE, p. 2185-2191.*

Nokia, Fast Hybrid ARQ description, Aug. 22, 2000, google.com, TSGR1#15(00)1085, 3GPP TSG RAN WG1, p. 1-4.*

Lin et al., automatic repeat request error control schemes, Dec. 1984, IEEE communication Magazine, vol. 22, No. 12, p. 5-17.*

Minn, Hlaing; Zeng, Mao; Annamalai, Annamalai J.; Bhargava, Vijay K.; An Efficient ARQ Protocol for Adaptive Error Control Over Time-Varying Channels; Wireless Personal Communications; Jan. 4, 2001; pp. 3-20.

(Continued)

*Primary Examiner*—Shelly Chase

(57) ABSTRACT

HARQ methods and systems and systems are provided which adaptively switch between two modes such as an NCP (non-complete puncture) mode, and a SAW (stop and wait) mode. Advantageously, this is done to avoid buffer overflow associated with ongoing NCP, and the delay associated with SAW. The switch between the modes can be performed on the basis of any number of criteria. These may include buffer size, consecutive negative acknowledgements in respect of either of the modes, length of time in one or the other mode, to name a few examples.

31 Claims, 13 Drawing Sheets

OTHER PUBLICATIONS

Park, Seong-Soo; Song, Young-Jae; Cho, Dong-Ho; Performance Analysis of Dual-Mode Selective Repeat ARQ Mechanism in Fading Channel Environments; IEEE; 1999; pp. 2885-2889.

Kallel, Samir; Efficient Adaptive Coding Rate Hybrid ARQ Protocols; IEEE; 1992; pp. 953-957.

Chen, Chun-Xiang; Komatsu, Masaharu; Kinoshita, Kozo; Channel-Grouping Methods on Go-Back-N ARQ Scheme in Multiple-Parallel-Channel System; 2334b IEICE Transactions on Communications E77-B (1994) Feb., No. 2, Tokyo, JP; pp. 265-269.

Annamalai, A.; Bhargava, Vijay K.; Analysis and Optimization of Adaptive Multicopy Transmission ARQ Protocols for Time-Varying Channels; IEEE Transactions on Communications, vol. 46, No. 10, Oct. 1998; pp. 1356-1368.

\* cited by examiner

ADAPTIVE MULTI-MODE HARQ SYSTEM AND METHOD

RELATED APPLICATIONS

This application claims the benefit of prior U.S. Provisional Application Nos. 60/340,024 filed on Dec. 10, 2001 and 60/342,946 filed on Dec. 21, 2001.

FIELD OF THE INVENTION

The invention relates to systems and methods for re-transmitting packets after they have been initially transmitted and received in error.

BACKGROUND OF THE INVENTION

In wireless communications systems, HARQ (Hybrid-Automatic-Repeat-Request) protocols are responsible for error control between transmitters and receivers.

One common existing approach is referred to as the "stop and wait" (SAW) approach involves the insertion of the re-transmit packet into the normal packet transmission flow, with the sequence of scheduled normal packet transmission stalled to allow re-transmission of the erroneous packet. One problem with this approach is that the re-transmit packets take away from the bandwidth available for new transmissions, and the re-transmit packets introduce delay into all subsequent re-transmissions. This approach is shown in FIG. 1A where the packets numbered "1" to "4" to be transmitted are generally indicated by 20, and the stream of actual packet transmissions is indicated generally by 22, and the acknowledgement sequence is indicated at 24. After a NAK (negative acknowledgement) indicating failed transmission is received in respect of packet "1", the packet is re-transmitted after packet "2", with the remaining packets being forced to wait. When an ACK acknowledgement) is received indicating successful transmission of packet "2", packet "3" is then transmitted and so on.

In another existing approach shown in FIG. 1B, rather than re-transmitting a packet identical to the original packet, the re-transmitted packets contain the entire systematic content of the original packet but contain different versions of the redundancies. Thus, in the packet flow 30 of FIG. 1B, packet "1(1)" is a re-transmitted version of packet "1" with a first revised set of redundancies, and the packet "1(2)" is a re-transmitted version of packet "1" with a second revised set of redundancies. These re-transmitted packets are shown inserted directly within the transmission flow, so this is a stop and wait scheme. Alternatively, the re-transmission flow can be transmitted on a separate physical channel as shown in FIG. 1C.

Another approach which has been employed is referred to as AAIR (asynchronous adaptive incremental redundancy). In this approach, packets are divided up into three segments, the first containing a systematic component and some redundancy, and the second and third segments only containing redundancy. In the event the initial packet transmission is in error, the first segment is re-transmitted. If the packet still cannot be recovered, the second segment is re-transmitted. Finally, if the packet still cannot be recovered, the third segment is re-transmitted. The original transmission plus the re-transmitted segments are combined using Chase and incremental redundancy (IR) combining.

U.S. patent application Ser. No. 10/074,701 entitled "Partial Puncture Re-Transmission" filed Feb. 13, 2002 and commonly assigned with this application hereby incorporated by reference in its entirety, teaches another incremental redundancy approach referred to as the Non-complete puncture (NCP) approach in which for re-transmission, re-transmit packets are formed with different versions of redundancy as in the example of FIG. 1B. Each re-transmit packet is divided into a large number of segments or sub-packets, for example six per packet. The bits of these sub-packets, one sub-packet at a time, are inserted by puncturing them into the regular transmission stream, thereby having no effect on the regular transmission schedule. One issue with this approach is that it is possible that a large number of re-transmissions will be required before sufficient redundancy is re-transmitted to allow successful reception. For example, compared to simply re-transmitting the packet three times, re-transmission using $\frac{1}{6}^{th}$ sub-packets may take up to 18 time slots and this delay may be too long. Another issue with this approach is that at the receiver, the entire "soft packet" received so far needs to be stored, and this can lead to significant buffer requirements since many packets can be transmitted and many re-transmissions may be occurring simultaneously. This approach does offer the benefit of time diversity. This NCP approach is depicted in FIG. 2 where the regular packet flow is indicated generally by 40, and the ACK/NAK stream is indicated at 42. For packet "1" which was received in error, a re-transmit packet 44 is generated. This is referred to as "1(1)" because subsequent re-transmit packets may be employed which would contain different versions of redundancy. Also shown is a re-transmit packet 46 for packet "3" which was also received in error. Each of these re-transmit packets is in turn is divided into respective sets of sub-packets, the illustrated example showing six sub-packets per re-transmit packet. These re-transmit sub-packets are then inserted by puncturing, one sub-packet at a time in each slot of the regular transmission. Thus, the first sub-packet of the first re-transmit packet 44 is inserted into by puncturing packet "3", the second sub-packet of the first re-transmit packet 44 is inserted by puncturing into packet "4", and so on.

SUMMARY OF THE INVENTION

HARQ methods and systems and systems are provided which adaptively switch between two modes such as an NCP (non-complete puncture) mode, and a SAW (stop and wait) mode. Advantageously, this is done to avoid buffer overflow associated with ongoing NCP, and the delay associated with SAW. The switch between the modes can be performed on the basis of any number of criteria. These may include buffer size, consecutive negative acknowledgements in respect of either of the modes, length of time in one or the other mode, to name a few examples.

According to one broad aspect, the invention provides a method of performing packet re-transmission comprising: providing a first re-transmission mode and a second re-transmission mode; and switching between executing the first re-transmission mode and executing the second re-transmission mode.

In some embodiments, the first re-transmission mode is a parallel re-transmission mode and the second re-transmission mode is a stop and wait (SAW) mode.

In some embodiments, a switch from the first mode to the second mode occurs after transmission of a predetermined number of first mode transmissions in respect of a given packet.

In some embodiments, a switch from the first mode to the second mode occurs as a function of one or more system parameters.

In some embodiments, the one or more system parameters comprise a receiver buffer occupancy by first mode content.

In some embodiments, the switch from the first mode to the second mode occurs when the receiver buffer occupancy exceeds a threshold.

In some embodiments, the SAW mode comprises: defining a plurality of re-transmit packets for a packet to be re-transmitted, each having different redundancies; and inserting the re-transmit packets one at a time into a normal packet flow in place of normal packets.

In some embodiments, the parallel re-transmission mode comprises: defining at least one re-transmit packet for a packet to be re-transmitted; dividing each re-transmit packet into a respective plurality sub-packets; transmitting a subset of the sub-packets of one of the re-transmit packets using a transmission channel parallel to a normal packet flow.

In some embodiments, the parallel re-transmission mode is a non-complete puncture (NCP) mode in which transmitting a subset of the sub-packets of one of the re-transmit packets using a transmission channel parallel to a normal packet flow comprises inserting the subset of the sub-packets of one of the re-transmit packets into one or more normal packets of a normal packet flow by puncturing the one or more normal packets with bits from the subset of sub-packets.

In some embodiments, each re-transmit packet contains systematic content from an original packet with different redundancies.

In some embodiments, the method further comprises transmitting control information indicating which of the first re-transmission mode and second re-transmission mode is a current mode of operation of re-transmission.

In some embodiments, the method further comprises transmitting control information indicating for SAW mode which re-transmit packet is being transmitted.

In some embodiments, the method further comprises wherein for a given NCP transmission, the subset of sub-packets can have a variable size, the method further comprising transmitting control information indicating for NCP mode how many NCP sub-packets are in the subset.

In some embodiments, the entire subset is punctured into a single normal packet.

In some embodiments, the method further comprises providing a first acknowledgement channel in respect of the first mode and a second acknowledgement channel in respect of the second mode.

In some embodiments, the method further comprises performing a switch between modes as a function of the first acknowledgement channel.

In some embodiments, a switch between modes as a function of the first acknowledgement channel is performed after a predetermined number of negative acknowledgements are received in respect of first mode operation.

In some embodiments, the method further comprises performing a switch between modes as a function of the second acknowledgement channel.

In some embodiments, a switch between modes as a function of the second acknowledgement channel is performed after a predetermined number of negative acknowledgements are received in respect of second mode operation.

According to one broad aspect, the invention provides a transmitter adapted to performing packet re-transmission by: providing a first re-transmission mode and a second re-transmission mode; anti switching between executing the first re-transmission mode and executing the second re-transmission mode.

In some embodiments, the first re-transmission mode is a parallel retransmission mode and the second re-transmission mode is a stop and wait (SAW) mode.

In some embodiments, a switch from the first mode to the second mode occurs after transmission of a predetermined number of first mode transmissions in respect of a given packet.

In some embodiments, a switch from the first mode to the second mode occurs as a function of one or more system parameters.

In some embodiments, the one or more system parameters comprise a receiver buffer occupancy by first mode content.

In some embodiments, the SAW mode comprises: defining a plurality of re-transmit packets for a packet to be re-transmitted, each having different redundancies; and inserting the re-transmit packets one at a time into a normal packet flow in place of normal packets.

In some embodiments, the parallel re-transmission mode comprises: defining at least one re-transmit packet for a packet to be re-transmitted; dividing each re-transmit packet into a respective plurality sub-packets; transmitting a subset of the sub-packets of one of the re-transmit packets using a transmission channel parallel to a normal packet flow.

In some embodiments, the parallel re-transmission mode is an NCP mode in which transmitting a subset of the sub-packets of one of the re-transmit packets using a transmission channel parallel to a normal packet flow comprises inserting the subset of the sub-packets of one of the re-transmit packets into one or more normal packets of a normal packet flow by puncturing the one or more normal packets with bits from the subset of sub-packets.

In some embodiments, a transmitter is adapted to transmit control information indicating which of the first and second mode is a current mode of operation of re-transmission, and to transmit control information indicating for SAW mode which re-transmit packet is being transmitted.

In some embodiments, a transmitter is further adapted to receive a first acknowledgement channel in respect of the first mode and a second acknowledgement channel in respect of the second mode.

In some embodiments, a transmitter is further adapted to perform a switch between modes as a function of the first acknowledgement channel, the second acknowledgement channel, or a combination of the first acknowledgement channel and the second acknowledgement channel.

According to one broad aspect, the invention provides a packet re-transmission system comprising: first re-transmission mode means providing a first parallel re-transmission mode; second re-transmission mode means providing a second stop and wait re-transmission mode; and mode switching means for switching between executing the first parallel re-transmission mode and executing the second stop and wait re-transmission mode.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

A first embodiment of the invention provides a re-transmission method having some of the benefits of the above-introduced NCP approach, without the drawback of potentially very high delay. In this embodiment, after an error in an initial packet transmission has occurred, incremental redundancy is employed to transmit re-transmit packets using any suitable parallel re-transmission mode. Preferably, the re-transmit packet is the failed packet, or a portion of a packet having the same systematic content but different redundancy. By parallel re-transmission, it is meant that any channel can be used which does not introduce delay into the regular packet transmission. Thus, this would include the puncturing approach or a separate physical channel for example.

For a given packet, after a set number of packet re-transmissions or some other criteria is satisfied, in order to cap the delay, a switch from the parallel transmission mode to the stop and wait approach is made. This results in the benefits of time diversity and minimal throughput impact being realized during the packet re-transmission period, but with a switch being made to avoid too high a delay from occurring for a given packet.

Preferably, non-complete puncture (NCP) HARQ is used for the parallel transmission mode. NCP has been proposed to improve the system performance for HARQ re-transmission. This technique is extremely powerful when the received CIR is large enough. However, in case of low received CIR, the benefit is limited because there is not enough energy to be contributed to NCP packet storage. To solve this problem, an optimum maximum number of NCP packets can be determined, which depends on the received geometry (corresponding to the long term average CIR). If the geometry is large enough, we may choose a large number for NCP sub-packet transmission and vice versa.

However, it is not easy to estimate the user geometry. In order to deal with such a problem, in another embodiment of the invention, an adaptive NCP-HARQ is provided which switches between two HARQ protocols based on the receiver buffer size. This works because the receiver buffer size depends strongly on the received CIR corresponding to user geometry.

In this case, the adaptive NCP-HARQ is an adaptive transmission method which switches between NCP-HARQ and normal HARQ (for example, stop and wait HARQ (SAW-HARQ)) based on the occupied receiver buffer size. That means, it the occupied receiver buffer size is less than a predetermined level, the NCP-HARQ transmission should be continued. Otherwise, stop NCP-HARQ and switch to normal HARQ transmission such as SAW-HARQ transmission.

Figure 7:
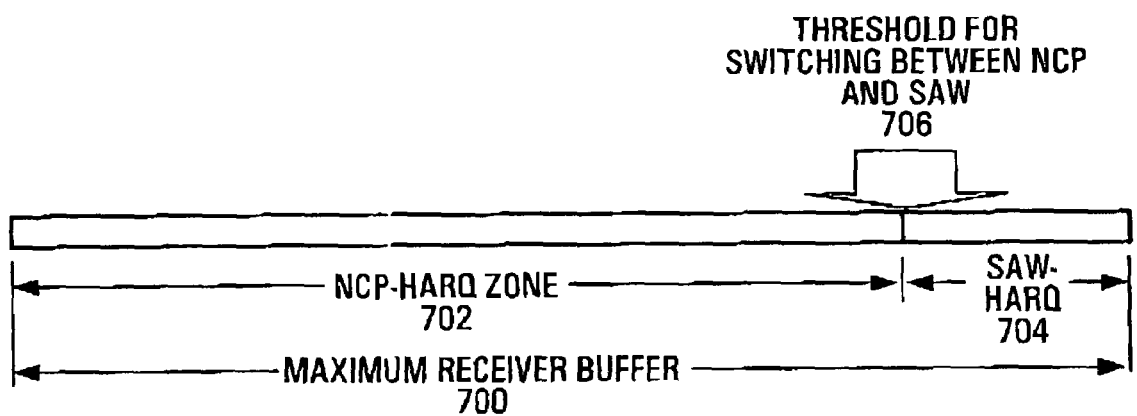
FIG. 7 is an illustrative example of the how buffer size is used to switch between re-transmission modes, according an example of one embodiment of the invention.

Referring now to FIG. 7, the maximum receiver buffer 700 is defined as the size of a buffer provided for storing the NCP content for HARQ re-transmission, NCP content being the memory being used to store failed packets before or after combining with one or more NCP sub-packets. In other words, if the total NCP content is over that level, this buffer has no space to store new failed packets. The NCP-HARQ zone 702 is defined as a zone as a function of buffer occupancy where the NCP-HARQ is implemented. The SAW-HARQ zone 704 is defined as a zone as a function of buffer occupancy, where the SAW-HARQ is implemented instead of NCP-HARQ. A threshold 706 is shown for switching between NCP and SAW. This threshold, together with the received buffer occupancy determine whether the transmitter should use NCP-HARQ transmission or SAW-HARQ transmission.

There are at least two benefits to use adaptive NCP-HARQ. Firstly, it can avoid the overflow of the receiver buffer. Secondly, it can be used to efficiently transmit data packets under different channel conditions (low and high geometry, or low and high Doppler spread).

In summary, the sub-packet re-transmission approach is employed until the available buffer memory becomes smaller than a threshold at which point, a switch to the stop and wait approach is made. Switching to the SAW approach will relieve the buffer because no new data flow is being transmitted during re-transmissions, in contrast to the NCP approach characterized by constant re-transmission of new data.

For example, packet size might be 19200 bits, requiring 19200×4 bits of buffer space (accounting for the required soft bits for incremental redundancy combining) per packet, and the buffer size might be 1 Meg, allowing for the storage of about 13 packets in total. In order to accommodate a larger number of packets in re-transmission state, a larger buffer would be required. Instead of providing a larger buffer, after the buffer becomes filled to some threshold, for example 80%, a switch to the SAW method is made to relieve the buffer. This switch (can be made until the buffer size drops below the threshold, or drops below another threshold smaller than the initial switch threshold, thereby providing some hysterisis, and avoiding rapid switching back and forth between modes.

More generally, any suitable criteria may be used to trigger the switching back and forth between the two approaches. The buffer size is very easy to measure and as such is easily implementable. For example, in another approach, the long term average C/I is measured, and as the long term average C/I becomes low, for example lower than a threshold, a switch is made from the NCP approach to the SAW approach.

Two embodiments have been described for re-transmission. In order for an overall system to function effectively, it is desirable to inform the receiver when switches between modes are going to occur such that the received packets can be processed accordingly. Preferably, a control signalling channel is provided for communicating these mode changes from the transmitter to the receiver.

Figure 1A:
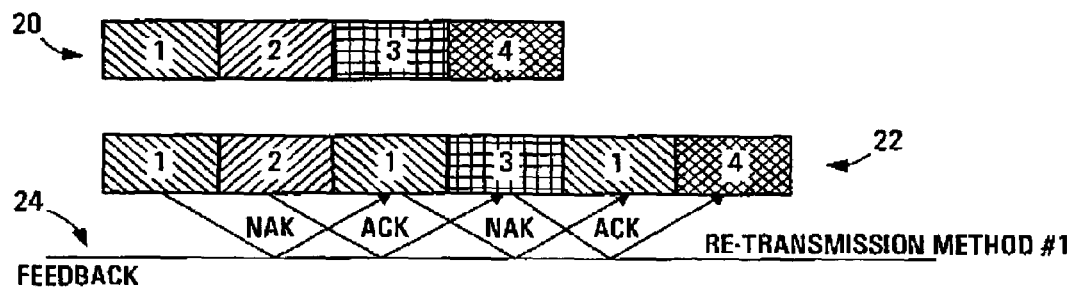
FIG. 1 provides an illustrative definition of three conventional packet re-transmission methods.
Figure 1B:
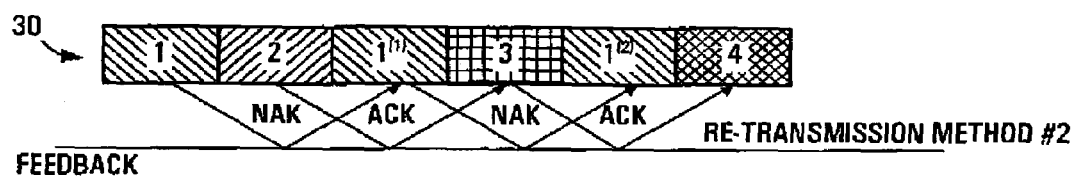
Figure 1C:
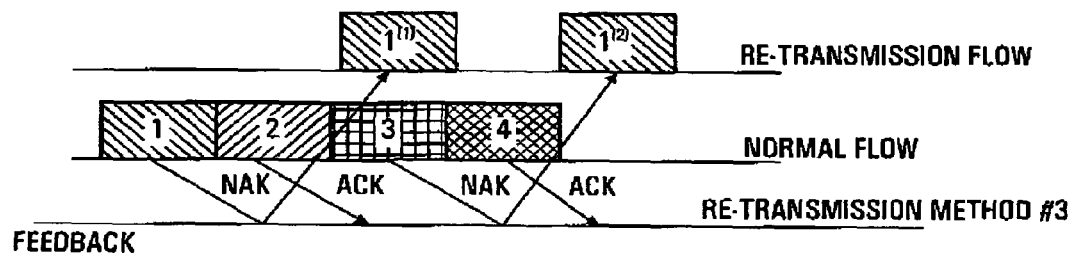
Figure 2:
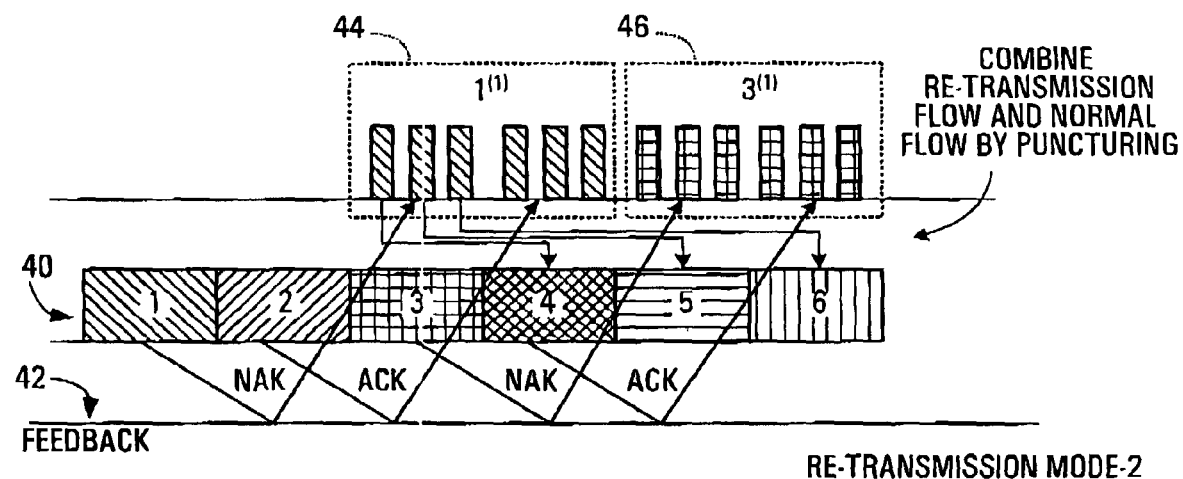
FIG. 2 provides an illustrative definition of a non-complete puncture re-transmission method.
Figure 3:
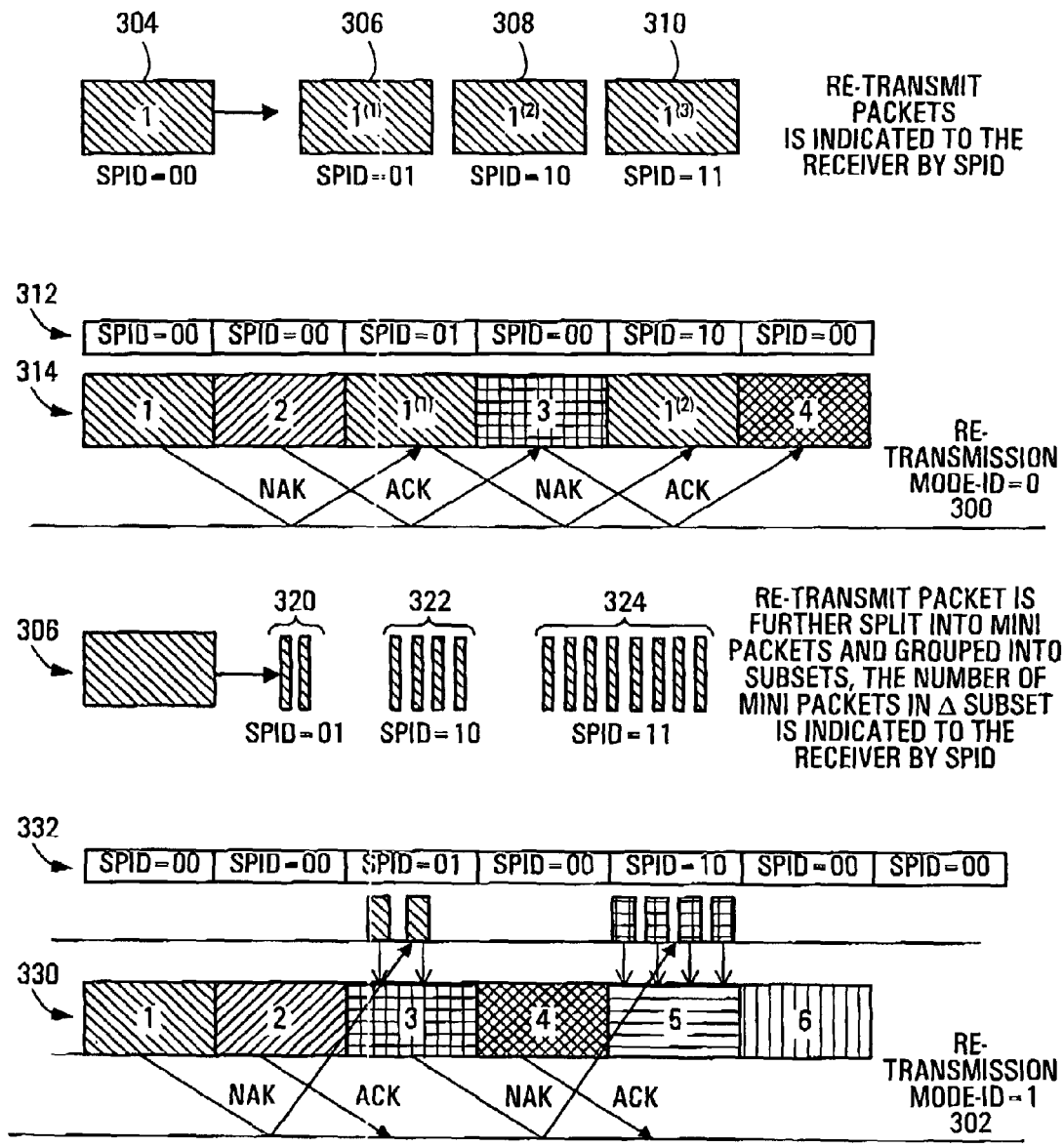
FIG. 3 provides an illustrative example of a re-transmission method provided by an embodiment of the invention and an example of an associated forward/reverse link control signaling.
Figure 4:
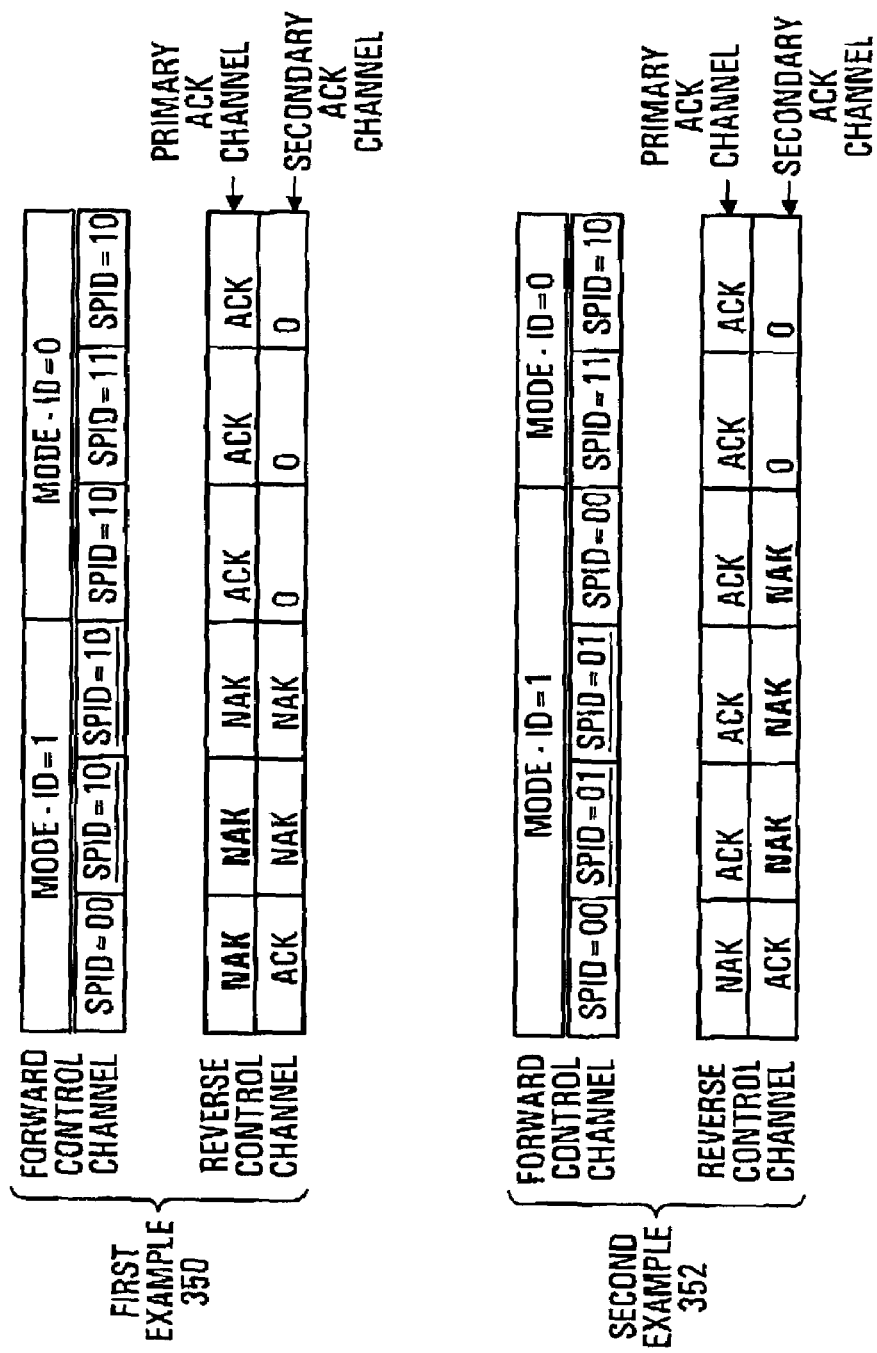
FIG. 4 is a chart of an example set of adaptive re-transmission strategies.

A detailed example of the invention featuring a control channel will now be described with reference to FIG. 3. In this embodiment, as described below, while in NCP mode, a variable number of sub-packets is employed. The re-transmission sub-packet is associated with an identification number called a SPID (sub-packet identifier). The decoder uses the SPID to perform correctly the code combining. The SPID is also used to indicate the size of the split sub-packet set.

Two modes of operation are illustrated, each mode of operation having a mode identifier, indicated by a first mode Mode-ID=0 300 which is a SAW mode, and a second mode Mode-ID=1 302 which is an NCP mode. A single mode bit can be used to indicate the current mode of operation, and this can be sent on a forward signalling channel. For SAW mode 300, an original packet "1" 304 is shown, together with three subsequent re-transmission versions "1(1)" 306, "1(2)" 308 and "1(2)" 310 each of which contain different versions of redundancy. While in the first mode 300, SAW HARQ is performed, so an example sequence of transmitted packets 314 is "1", "2", "1(1)", "3", "1(2)", "4". Upon receipt of a NAK in respect of a given packet, a re-transmit packet is sent. Upon receipt of an ACK, a new packet is sent. It is noted that in the illustrated examples the normal transmit packets and associated re-transmit packets are all shown to be the same size. More generally, the transmit stream may consist of a sequence of packets/re-transmit packets of varying size.

While in SAW mode, the forward control channel is used to indicate whether a given packet is a new packet, or what version of a re-transmit packet it is. In the illustrated example, a two bit SPID (sub-packet identifier) is used to this effect, with SPID=00 indicating the original packet 304, SPID=01 indicating the first re-transmit packet 306, SPID=10 indicating the second re-transmit packet 308, and SPID=11 indicating the third re-transmit packet 310. In the example, the control channel 312 contains a sequence of SPIDs 00,00,01,00,10,00 which are used to identity the type of packets in the sequence 314, namely a new packet, a new packet, a first re-transmit packet, a new packet, a second re-transmit packet, and a new packet. Of course any suitable method of indicating this may be employed.

In the second mode of operation 302, each re-transmit packet is further divided into sub-packets, for example eight sub-packets per re-transmit packet. A given NCP re-transmission for the original re-transmit packet consists of transmitting a subset or all of the sub-packets of the re-transmit packet punctured into one or more normal transmit packets. In the illustrated example, in NCP mode, for a given NCP re-transmission, two, four or eight sub-packets are sent in which case the sub-packets are organized into subsets of two, four or eight respectively. In the illustrated example, the re-transmit packet "1(1)" 306 is shown organized into subsets of either two 320, four 322, or eight sub-packets 324.

While in NCP mode, in the illustrated example the forward control channel is used to indicate how many sub-packets are in a subset and will be transmitted as part of an NCP re-transmission. In the illustrated example, a two bit SPID is used to this effect, with SPID=00 indicating no sub-packets are being transmitted, with SPID=01 indicating there is a subset SET-1 of two sub-packets, SPID 10 indicating that there is a subset SET-2 of four sub-packets, SPID=11 indicating that there is a subset SET-3 of eight sub-packets. This is particularly advantageous for systems with variable packet size. A larger packet will allow the puncturing of a larger number of bits, and thus can potentially accommodate more punctured sub-packets than a smaller packet. In some systems, such as systems with fixed packet size, it is not necessary to provide different numbers of sub-packets in a NCP re-transmissions, and a constant number (one or some other number) of sub-packets is punctured for each packet with NCP content.

In NCP mode, a sequence of packets 330 consisting of packets "1", "2", "3", "4", "5", and "6" is shown. The control channel 332 (which can be the same as control channel 312 used for SAW mode) is shown containing a sequence of SPIDs 00,00,01,00,10,00,10. This means that the first, second, fourth and sixth packets have SPID 00 and do not contain any NCP content. The third packet "3" has SPID 01 and has been punctured to contain two NCP sub-packets of a re-transmit packet associated with packet "1" for which a NAK was received back from the receiver. The fifth packet "5" has SPID 10 and has been punctured which four sub-packets of a re-transmit packet associated with packet "3". In these examples, the NCP re-transmission sub-packets of a given re-transmission are all punctured into one normal flow packet, however, as indicated above, they may be spread over multiple packets in some embodiments.

Depending upon the amount of puncturing, a limit of one or more sub-packets may be imposed for insertion into a given packet. Preferably, only one sub-packet is inserted per slot. In this case, for different size subsets of sub-packets as identified by SPID 332, the punctured re-transmission would span over different lumbers of packets. For this example, Set-1 320 would span two packet lengths instead of just one as illustrated, and Set-2 322 would span four packet lengths instead of just one as illustrated.

The mode identifier and the SPID sequence can be sent over any suitable control channel. In FIG. 3, the subsequent re-transmission sub-packets are identified with the SPID and the non-complete-punctured set of sub-packets are also identified by the SPID with respect to their number. Some advantages of the SPID for both mode-0 and mode-1 are that a single bit, namely the Mode-ID, can be used to perform the transition from one operational mode to another at any time. This single bit can be transmitted with minimum signaling, and therefore with minimum impact on RF capacity.

In the reverse direction, preferably two acknowledgement channels are provided, a first "primary acknowledgement" channel in respect of SAW mode, and in respect of new packets transmitted during NCP mode, and a second "secondary acknowledgement" channel in respect of NCP sub-packets. Either an ACK or NAK can be sent on either of these channels to indicate successful or unsuccessful decoding respectively. Any suitable physical realization of these channels can be employed, and they could be combined on a single channel and/or as part of some other reverse channel. Preferably, a single ACK/NAK is sent on the primary acknowledgement channel for each normal flow packet. Also, a single ACK/NAK is sent on the secondary acknowledgement channel for each NCP re-transmission. If subsets of two sub-packets constitute one NCP re-transmission, then a single ACK/NAK is sent after an attempt to decode the associated packet has been completed.

In another embodiment, the primary and secondary acknowledgement channels are used as the, or another, trigger for switching between HARQ modes. For example, adaptive mode transitions can be implemented which will allow speeding up the protocol recovery when some number of consecutive NAKs occurs in either the primary or the secondary reverse link ACK channels. Two examples, 350, 352 are shown which show parallel time lines for the mode, SPID, primary acknowledgement channel and secondary acknowledgement channel.

In the first example 350, a transition from NCP mode to SAW mode is made after some number of normal packets are received in error. In the illustrated example, after three normal packets are received in error (as indicated by three primary acknowledgement channel NAKs), a switch to SAW mode is made. No NCP content is transmitted during SAW mode so the secondary acknowledgement channel is null during this time. This type of transition will deal with the buffer size problem, since it is the accumulation of regular packets which are not incorrectly received during the transmission of further new packets which will result in buffer overflow.

In the second example 352, a transition from NCP mode to SAW mode is made after some number of NCP re-transmissions are received in error. In the illustrated example, after three NCP re-transmissions are received in error (as indicated by three primary acknowledgement channel NAKs), a switch to SAW mode is made. No NCP content is transmitted during SAW mode so the secondary acknowledgement channel is null during this time. This type of transition will deal with the delay problem, since it is the ongoing transmission of NCP re-transmissions for a given packet which will introduce delay into the reception of that packet or of other packets which also require NCP bandwidth.

In the above described embodiment, a multiplexing of the transmission and re-transmission flow is constructed by using puncturing. Specifically, the sparse re-transmit packet is distributed evenly in time and punctured into the normally scheduled transmission data channel (flow). More generally, any parallel re-transmission channel approach can be employed. Such a parallel channel can be created in any dimension, such as parallel time slots, orthogonal code domain or frequency domain.

As indicated above, an adaptive re-transmission mode operation is provided based on the mode-0 and mode-1. The trigger for such a transition can be any suitable trigger defined for a given implementation. This allows optimizing the system performance under different conditions. Furthermore, where NCP and SAW are the preferred modes, more generally any first and second HARQ modes can be employed where one has the ability to reduce delay better than the other, sometimes at the expense of causing other packets to wait.

Figure 5:
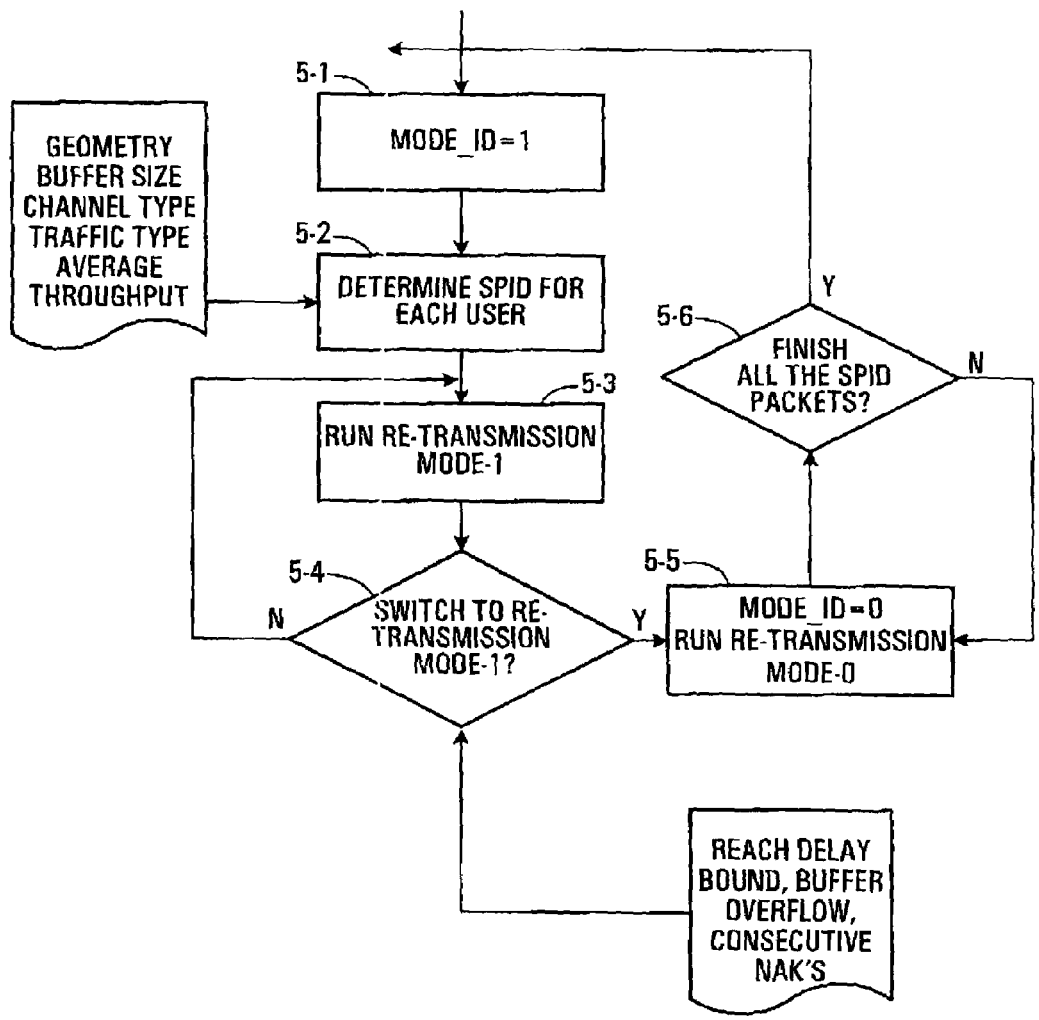
FIG. 5 is a flowchart of an example method of switching between adaptive re-transmission modes.

FIG. 5 shows the flow chart of the adaptive re-transmission modes and transitions between modes. Re-transmission beings in NCP mode, indicated by mode_ID=1, step 5-1. Next, the SPID is determined for each user at step 5-2. Recall this determines how many sub-packets per group are defined. This is set as a function of any suitable parameter(s). Several example parameters are indicated, including geometry, bluffer size, channel type, traffic type and average throughput, although others may be employed. Next, NCP mode re-transmission is executed at step 5-3. At step 5-4, a decision is made as to whether or not to switch to SAW mode (mode-0). This can be triggered by implementation specific conditions. In the illustrated example, several triggers including delay bound, buffer overflow, and consecutive NAK's are shown but others may alternatively be employed, or employed in combination. If it is not time to switch, operation continues with mode 1 transmission 5-3. Otherwise, the mode is switched to mode 0, and SAW re-transmission mode is executed at step 5-5 until either successful transmission (not shown) or until there are no more re-transmit packets as determined by condition block 5-6. When that is the case, the packet is a considered erroneous.

Figure 6:
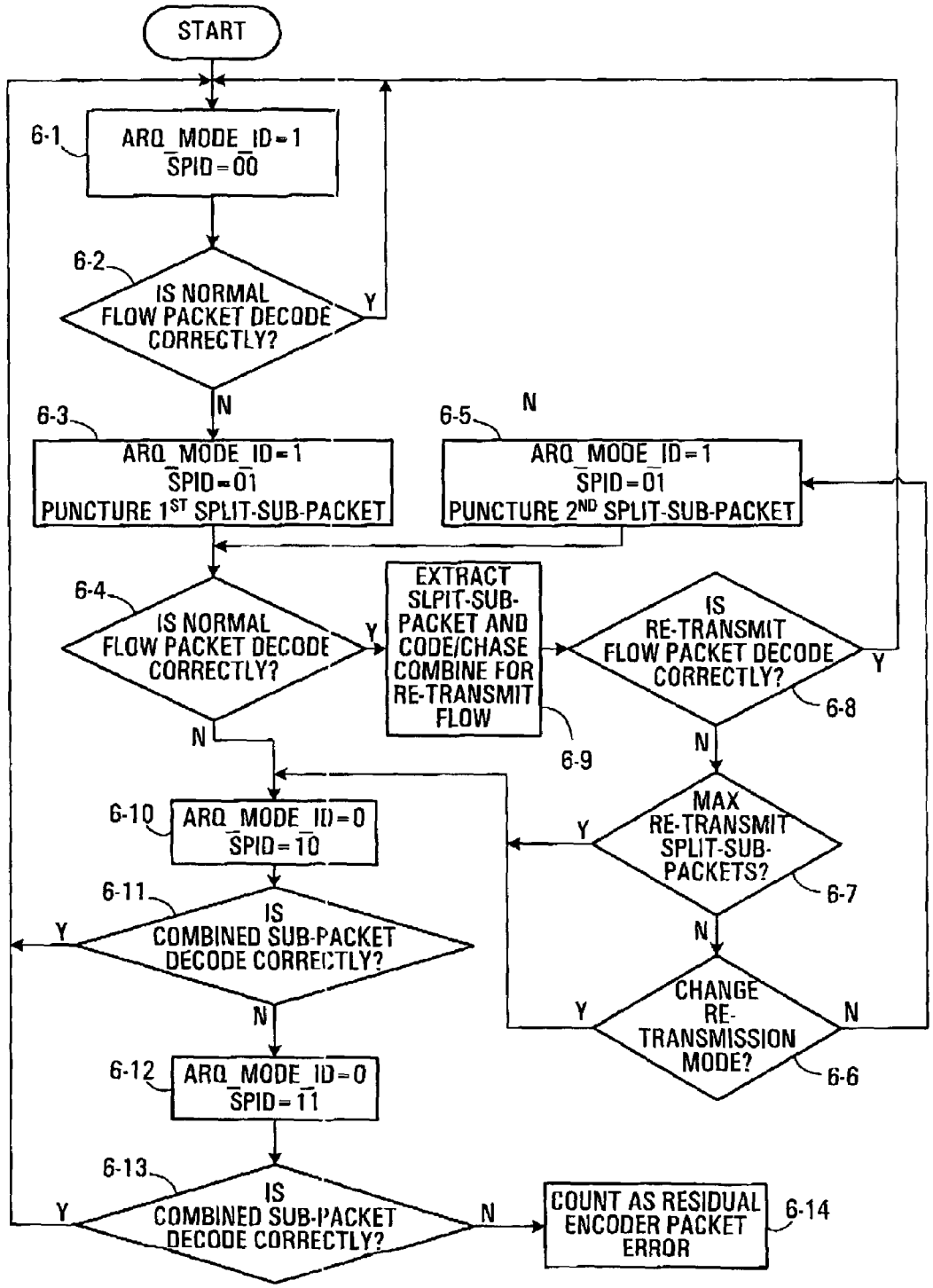
FIG. 6 is a flowchart of another example method of the adaptive switching between two re-transmission modes.

FIG. 6 is a flowchart of a more specific example of the operation of the two re-transmission modes. During step 6-1, the mode is NCP mode, but SPID is 00 since it is the first transmission of a give n packet. If the packet is decoded correctly (step 6-2), then no re-transmission is necessary, and the process continues with the next packet back at step 6-1. If the packet is not decoded correctly, then at step 6-3, puncturing of the first split sub-packet into a normal packet is performed. At step 6-4, if the normal packet is correctly decoded, then the inserted sub-packet is extracted and combined with previously received content. If this results in proper decoding of the re-transmit packet flow (yes path, step 6-8), then the method returns to step 6-1 with the normal transmission of another packet. On the other hand, if the re-transmit packet is not yet correctly decoded, then if the maximum number of re-transmit sub-packets is not yet reached (no path, step 6-7), and there is not some other trigger for changing the re-transmission mode (step 6-6), then the method continues with puncturing the next sub-packet into another normal packet at step 6-5. If the maximum number of split sub-packets has been reached (yes path, step 6-7) or some other trigger for mode change has occurred (yes path, step 6-6) then a switch in mode to SAW is performed at step 6-10, and a re-transmit packet is sent. If the combined packet is then correctly decodable (yes path, step 6-11) then the method returns to step 6-1. If not, then another re-transmit packet is sent at step 6-12. If the combined packet is then correctly decodable, the method returns to step 6-1. Otherwise, the packet is counted as a residual encoder packet error at step 6-14.

It is noted that if there are multiple packets waiting for NCP re-transmission, in one embodiment, NCP re-transmissions are conducted for the oldest such packet requiring re-transmission until successful transmission. Round trip acknowledgement delay may result in a window during which the oldest packet is awaiting acknowledgement. In this case, preferably, the second oldest packet requiring re-transmission scheduled for NCP re-transmission, and so on.

Simulation Results

To illustrate the effectiveness of the new systems and methods provided by embodiments of the invention, various simulations have been performed. It should be emphasized that these simulation results relate to an example set of parameters and similar results cannot be guaranteed in the more general application.

Figure 8:
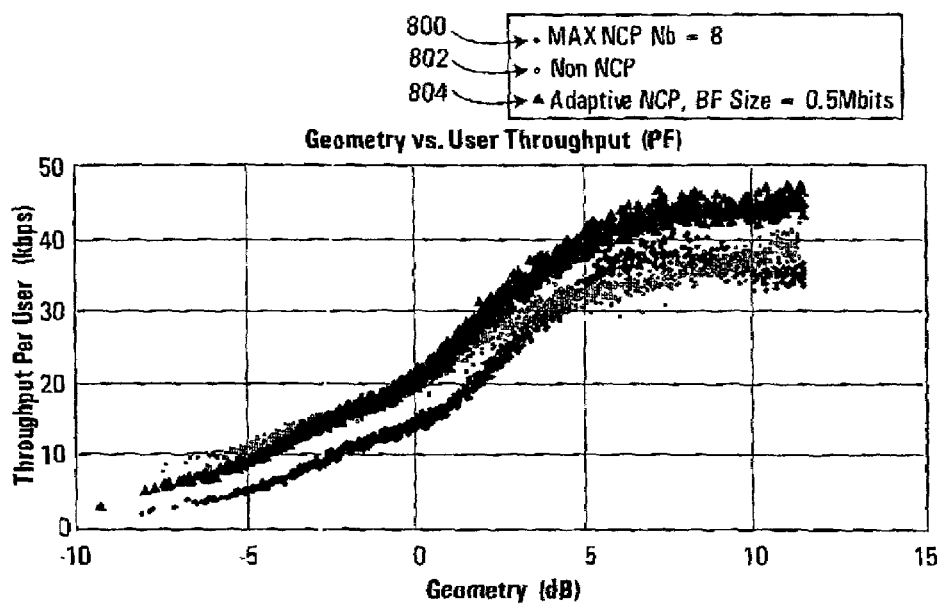
FIG. 8 provides example performance results consisting of throughput per user versus geometry using proportional fairness scheduling.
Figure 9:
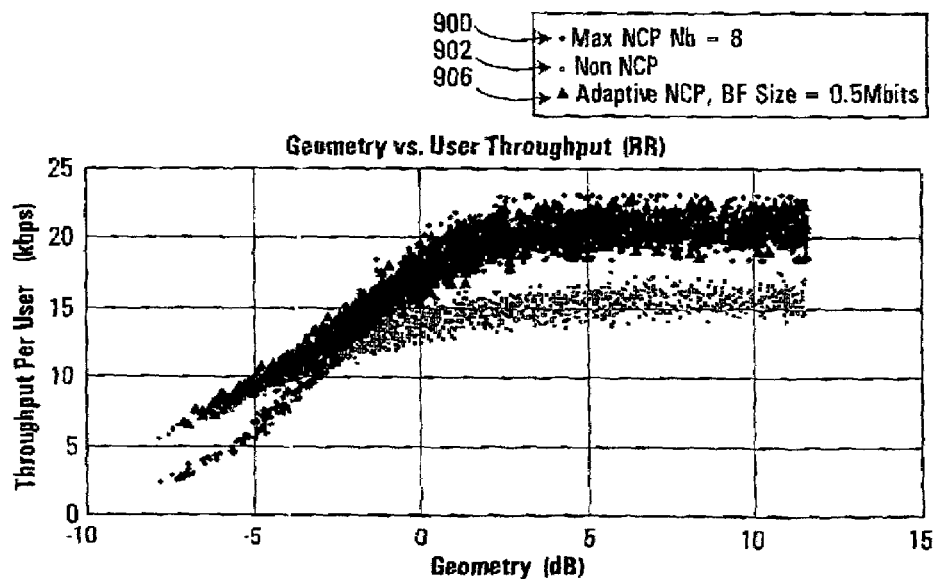
FIG. 9 provides example performance results consisting of throughput per user versus geometry using round-robin scheduling.

FIGS. 8 and 9 show the throughput performance with proportional fairness and round-robin schedulers respectively as a function of geometry (long term average CIR) with channel model C (see 1×EV-DV evaluation methodology, addendum (V6) Jul. 25, 2001). Referring firstly to FIG. 8, three sets of results are shown for proportional fairness scheduler simulations. A first set of results, indicated by 800 is for a hybrid NCP/SAW scheme in which a switch from NCP to SAW takes place after the transmission of eight NCP sub-packets. A second set of results 802 is for conventional SAW re-transmission. A third set of results 804 is for adaptive NCP which switches as a function of buffer size to SAW when the buffer reaches 0.5 Mbits. Referring also to FIG. 9, three sets of results are shown for round-robin scheduler simulations. A first set of results, indicated by 900 is for a hybrid NCP/SAW scheme in which a switch from NCP to SAW takes place after the transmission of eight NCP sub-packets. A second set of results 902 is for conventional SAW re-transmission. A third set of results 904 is for adaptive NCP which switches as a function of buffer size to SAW when the buffer reaches 0.5 Mbits.

From these results, it can be seen that in both cases there is a crossover between non-NCP system and NCP-HARQ with fixed maximum NCP number (the number is eight). This crossover, however, can be removed by using adaptive NCP-HARQ. This is because when the received geometry is low, NCP-HARQ cannot provide enough energy to recover re-transmission sub-packet. In this case, the full sub-packet with normal HARQ is required. To switch between NCP-HARQ and SAW-HARQ, the adaptive NCP-HARQ is necessary. The adaptive NCP-HARQ may adjust the number of NCP sub-packets before switching it into SAW-HARQ mode so that the re-transmission can be efficiently performed under different channel conditions including channel model and geometry, and the total throughput gain can be significantly improved. (The detailed comparison is listed in Table 1.

Figure 10:
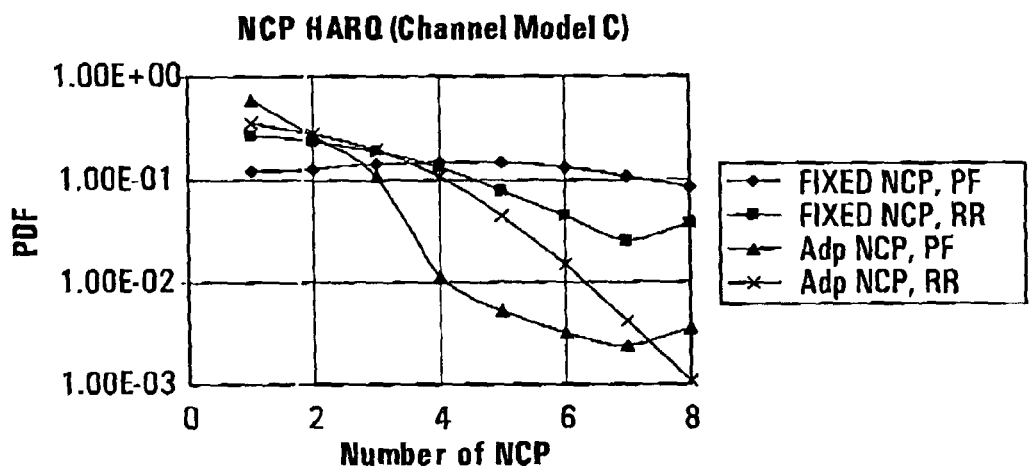
FIG. 10 provides example performance results consisting of a PDF versus the number of NCP sub-packets with either proportional fairness or round-robin scheduling.

FIG. 10 shows a PDF (probability density function) as a function of the number of NCP sub-packets with either proportional fairness (PF) or round-robin (RR) scheduler. From this figure, it can be seen that the probability of a small number of NCP sub-packets for the adaptive NCP-HARQ is much higher than for regular NCP-HARQ, while the probability of a large number of NCP sub-packets for the adaptive NCP-HARQ is much lower than NCP-HARQ.

Figure 11:
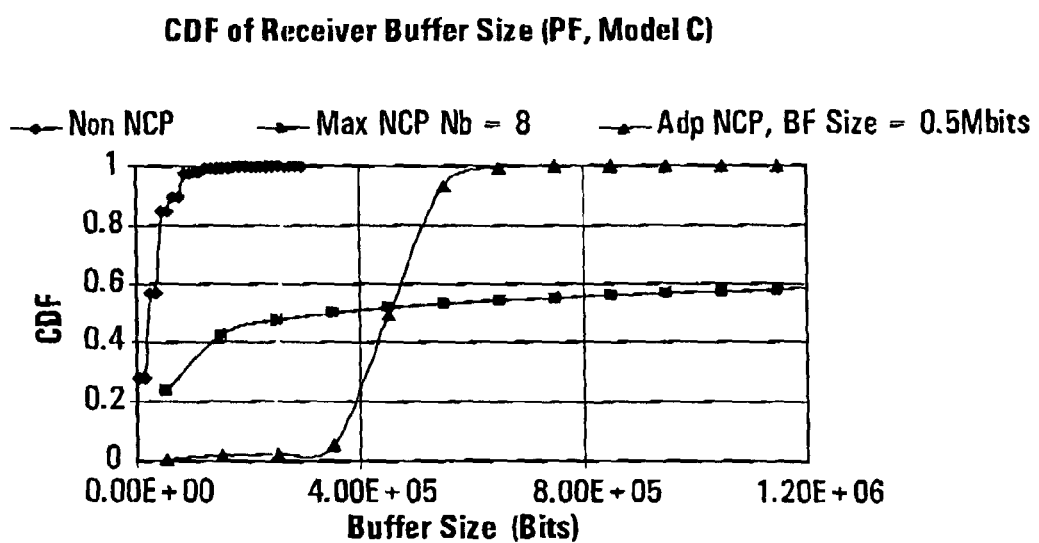
FIG. 11 provides example performance results consisting of a CDF versus receiver buffer size with proportional fairness scheduling.
Figure 12:
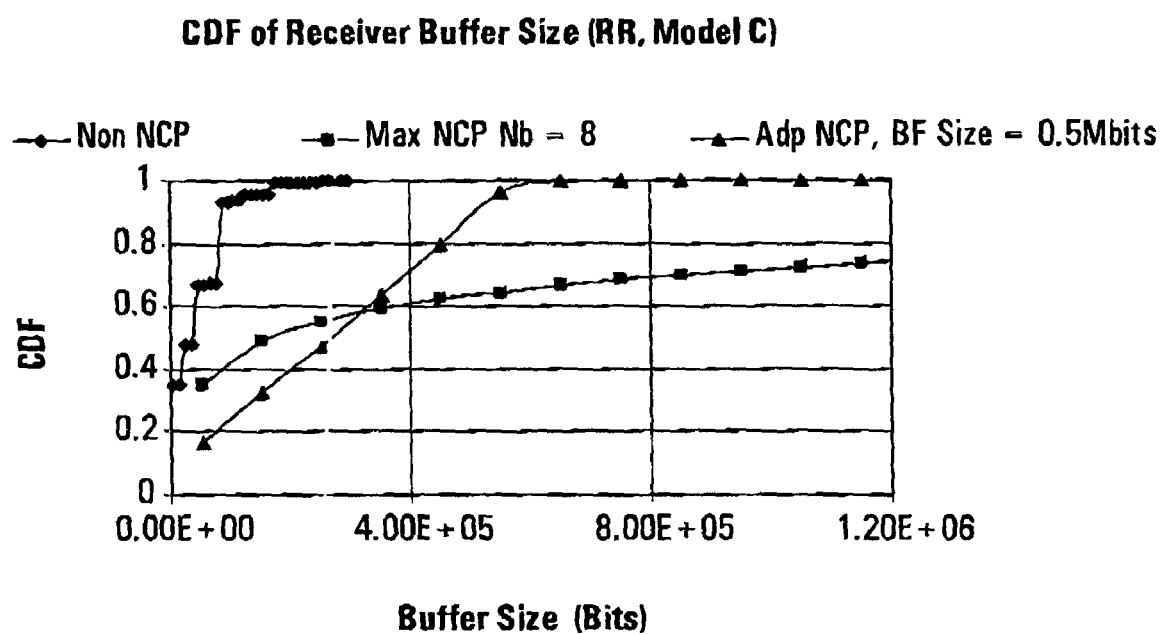
FIG. 12 provides example performance results consisting of a CDF versus receiver buffer size with round-robin scheduling.

FIGS. 11 and 12 show a CDF as a function of the receiver buffer size that is used to store the failed sub-packets for NCP-HARQ re-transmission, again for proportional fairness scheduling and round-robin scheduling respectively. From these Figures, it can be found that although adaptive NCP-HARQ requires a receiver buffer sizes as opposed to non-NCP system, the maximum buffer size can be controlled under a predetermined level (for example, 0.5 Mbits). This buffer size is much lower than that which results in a fixed NCP system.

Finally, a comparison is made between non-NCP, fixed NCP and adaptive NCP systems as listed in Table 1 below.

TABLE 1

Sector throughput and average residual FER.

|  | With NCP | Without NCP | Adaptive NCP BF = 0.5 Mbits | Gain for fixed NCP | Gain for adaptive NCP |
| --- | --- | --- | --- | --- | --- |
| Sector Throughput (kbps) | 433.73 346.81 | 495.49 274.97 | 558.91 352.05 | −12.46% 26.13% | 12.80% 28.03% |
| Average Residual FER | 1.22e−04 4.10e−05 | 3.86e−03 1.08e−03 | 5.327e−03 4.99e−04 | — — | — — |

This section describes the above described adaptive re-transmission procedures can be used in the 1×EV-DV extensions to cdma2000 to support the enhanced forward packet data channel (F-PDCH). These functions are implemented in the F-PDCH Control Function. The physical layer re-transmissions consist of two modes. The re-transmission mode is indicated to the mobile station by a ARQ_Mode_ID field in the F-SPDCCH (Forward Secondary Packet Data Control Channel) channel. The two modes are defined as: the full sub-packet re-transmission (ARQ_Mode_ID=0) and split sub-packet punctured re-transmission (ARQ_Mode_ID=1).

In the split sub-packet punctured re-transmission, the incoming new encoder packets are scheduled independent to the re-transmit packet. The re-transmit sub-packet is generated the same as in the case when ARQ_Mode_ID=0. The re-transmit sub-packet is further split into 8 fragments, "split sub-packets". A sub-set of these split sub-packets (2, 4, or 8) is punctured uniformly onto the parity part of the incoming new encoder packet without stalling the new encoder packet scheduling and transmission. Two separate ACK/NAK signallings are generated from mobile station to acknowledge the new encoder packet and the re-transmit split sub-packet.

Figure 13:
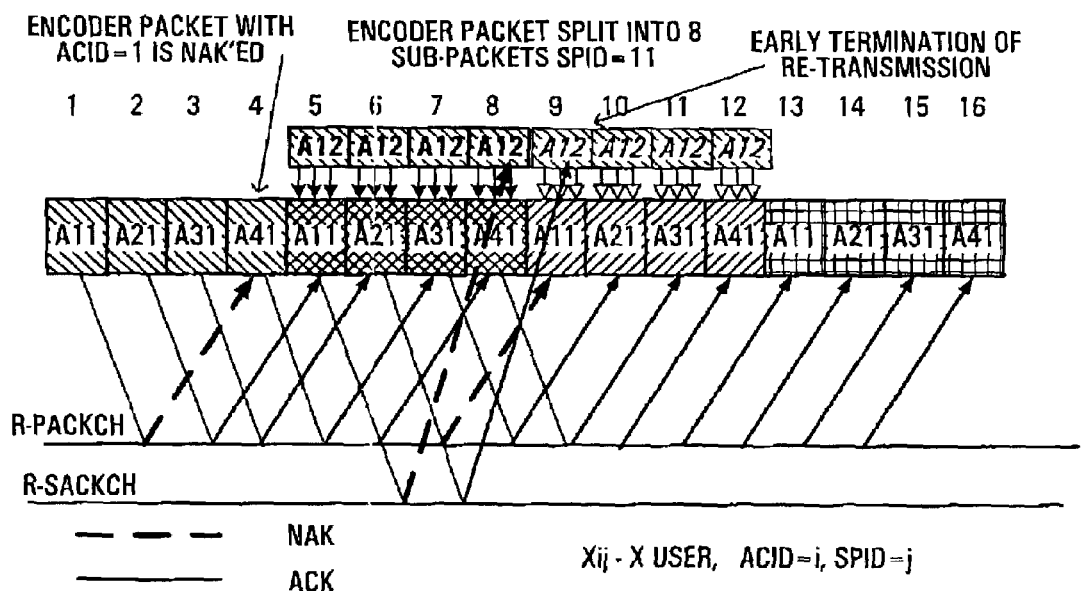
FIG. 13 is an illustrative example of split sub-packet re-transmission.

When the first sub-packet from an encoder packet is transmitted, SPID on the F-SPDCCH is set to '00'. If the scheduled mobile station detects control information directed towards it on the F-PPDCCH (Forward Primary Packet Data Control Channel) and F-SPDCCH and succeeds in decoding the sub-packet, the mobile station sends an ACK on the Reverse Primary Acknowledgment Channel (R-PACKCH). No further sub-packets of this encoder packet are transmitted. If the mobile station detects control information on the F-PPDCCH and F-SPDCCH but is not successful in decoding the sub-packet, it sends a NAK on the R-PACKCH. In this case, when the mobile station is scheduled for service again, the incoming new packet is transmitted by the base station and the re-transmission of split sub-packets (e.g. 4 split sub-packets) are punctured onto the scheduled consecutive (4) encoder packets. The number of split sub-packets for puncturing onto the consecutive scheduled encoder packets is signaled to the mobile station by using the SPID field in the F-SPDCCH, namely SPID=01 for 2 split sub-packets, SPID=10 for 4 split sub-packets, SPID=11 for a split sub-packets. By this definition, SPID=00 indicates no split sub-packet puncturing, otherwise, puncturing is performed. An example of parallel channel operation and 8 split sub-packets puncturing with early termination of Reverse Secondary Acknowledgment Channel (R-SACKCH) is shown in FIG. 13.

Figure 14:
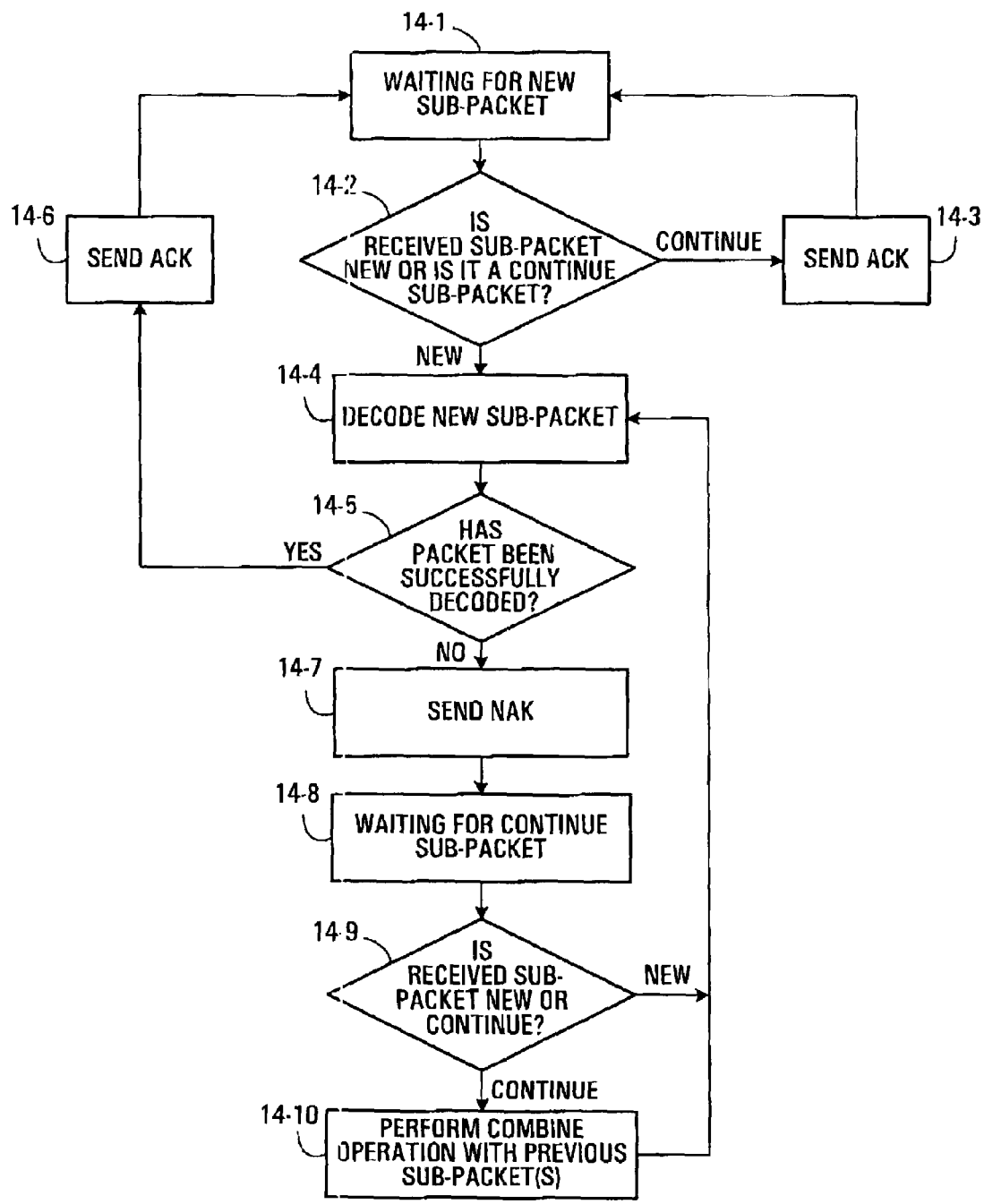
FIG. 14 is a flowchart of an example of receiver operation for single channel operation for SAW mode.

FIG. 14 slows a detailed example of the receiver operation for single channel operation for ARQ_Mode_ID=0. A brief description of the flow chart follows. When the receiver is waiting for a NEW sub-packet (SPID='00') if a new received packet is a NEW sub-packet (yes path, step 14-2) and the receiver attempts to decode it at step 14-4. If the decoding is successful (yes path, step 14-5) it transmits an ACK (step 14-6) and then waits for the next NEW sub-packet back at step 14-1. If the decoding is unsuccessful (no path, step 14-5), it transmits a NAK at step 14-7, stores the received sub-packet for subsequent combining with re-transmissions, and waits to receive a CONTINUE sub-packet (SPID≠'00') at step 14-8. If the receiver receives a CONTINUE sub-packet while waiting for one (yes path, step 14-9), it attempts decoding by combining the received sub-packet with stored information at step 14-10. If the decoding is successful, it transmits an ACK and waits for the next NEW sub-packet, while if decoding is unsuccessful, it transmits a NAK and then waits for the next CONTINUE sub-packet.

For the case when a receiver receives a NEW sub-packet while waiting for a CONTINUE ("new path", step 14-9), the receiver abandons recovery of the previous encoder packet and attempts to decode the encoder packet from the new received sub-packet at step 14-4.

When a receiver receives a CONTINUE sub-packet while waiting for a NEW ("continue" path, step 14-2), the receiver discards the received sub-packet, sends an ACK at step 14-3 and then continues to wait for a NEW sub-packet.

Figure 15:
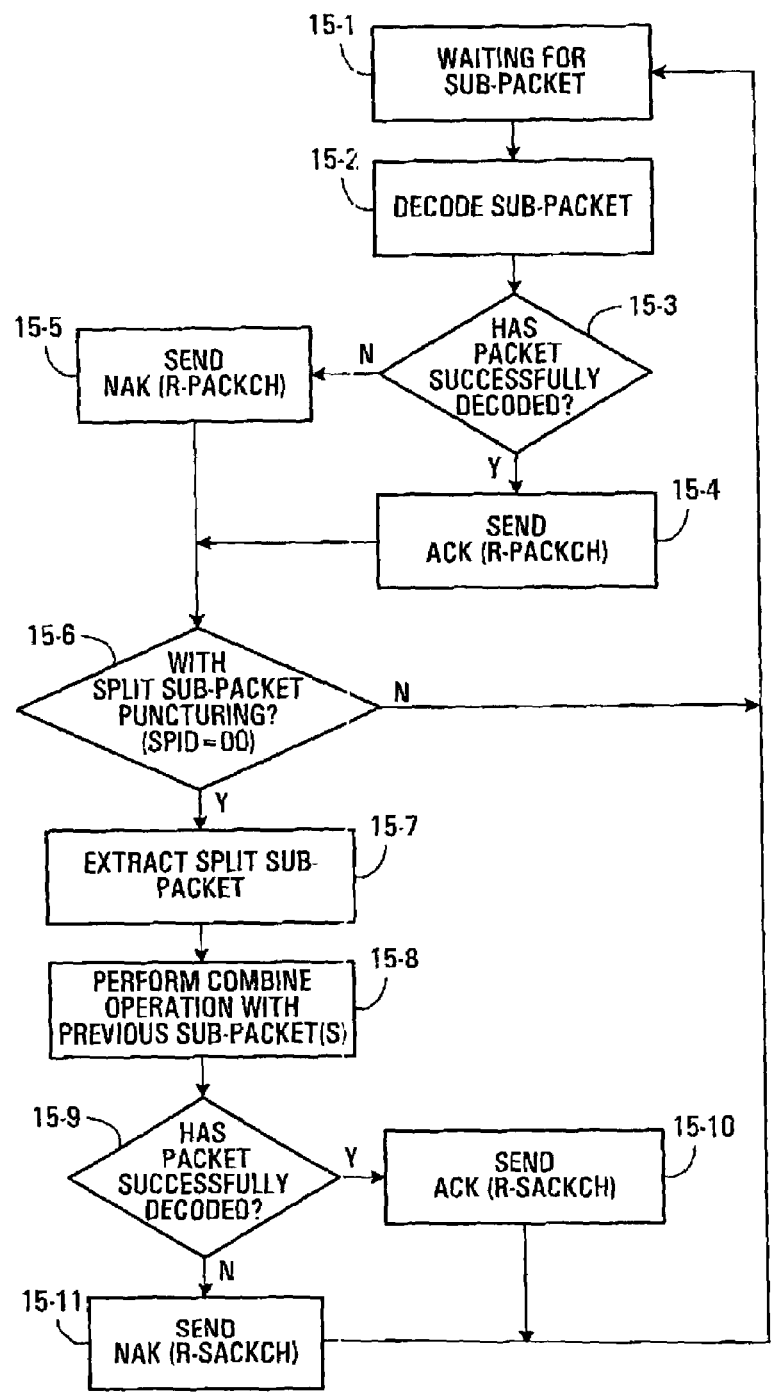
FIG. 15 is a flowchart of an example of receiver operation for single channel operation for NCP mode.

FIG. 15 shows an example of receiver operation for single channel operation for ARQ_Mode_ID=1 which begins by waiting for a sub-packet 15-1. At step 15-2, the sub-packet is decoded. If the packet is then successfully decoded at step 15-3 (yes path), then an ACK is sent at step 15-4 on the primary acknowledgement channel. If not, then an NAK is sent at stop 15-5. If split sub-packet puncturing is employed (yes path, step 15-6), then the split sub-packet is extracted (step 15-6) and combined with previous sub-packets (step 15-8). If the packet is successfully decoded at step 15-9, then an ACK is sent on the secondary acknowledgement channel at step 15-10 and the method returns to waiting for the next sub-packet. If the packet is still not successfully decoded then at step 15-11, a NAK is sent on the secondary acknowledgement channel.

Sub-Packet Symbol Selection

Encoder packets are transmitted as one or more sub-packets. The symbols in a sub-packet may be formed by scrambling and interleaving the turbo encoder output sequence and selecting specific sequences of symbols from the interleaved sequence. The resulting sub-packet sequence is a binary sequence of symbols for the modulator.

Symbol selection for the sub-packets shall be equivalent to an approach where they are selected from a sequence of concatenated interleaver output sequences as described below. Let:

k be the sub-packet index;

$N_{EP}$ be the number of bits in the encoder packet ($N_{EP}$=384, 768, 1536, 2304, 3072, or 3840);

$N_{Walsh,k}$ be the number of 32-chip Walsh channels for the k-th sub-packet;

$N_{slots,k}$ be the number of 1.25-ms slots for the k-th sub-packet;

$m_k$ be the modulation index for the k-th sub-packet ($m_k$=2 for QPSK, 3 for 8-PSK, and 4 for 16-QAM); and $SPID_k$ be the sub-packet ID for the K-th sub-packet ($SPID_k$=0, 1, 2, or 3).

Also, let the symbols in the concatenated sequence of interleaved symbols be numbered from zero. Then, the selected symbols for the k-th sub-packet shall be a sequence of $$L_k = 48 N_{Walsh,k} N_{slots,k} m_k$$

consecutive symbols starting at symbol $F_k$, where $$F_k = (SPID_k L_k) \bmod (5 N_{EP}).$$

The $N_{EP}$, $N_{Walsh,k}$, $N_{slots,k}$, and $m_k$ parameters are specified in above.

A sub-packet ID of 0 shall be used to identify the first sub-packet. The other sub-packets may be sent with sub-packet IDs of 1, 2, or 3. The sub-packet IDs do not have to be sent sequentially and a value can be used more than once. Typically, the sub-packet ID for the k-th non-initial sub-packet should be selected to minimize $$\min\{x, 5N_{EP} - x\}$$

where $$x = |F_k - (F_{k-1} + L_{k-1}) \bmod (5 N_{EP})|.$$

When ARQ_Mode_ID=1, the first re-transmit sub-packet with size $L_k$ is further split into 8 smaller split-sub-packets for puncture onto the (k+j)-th sub-packet with size ($L_{k+j} - N_{EP(k+j)}$)/8, the starting symbol for j-th split-sub-packet is at location ($L_k$j)mod(5$N_{Ej'k}$), j=1, 2, . . . , 8. The split-sub-packet puncture location is defined as ($N_{EP(k+j)}$+8i)-th bit of (k+j)-th sub-packet, where i=0, 1, . . . , ($L_{k+j} - N_{EP(k+j)}$)/8. Modulation Numerous modifications and variations of the present invention are possible in light of the above teachings. It is therefore to be understood that within the scope of the appended claims, the invention may be practiced otherwise than as specifically described herein.

We claim:

1. A method of performing packet re-transmission comprising:
   providing a first re-transmission mode and a second re-transmission mode; and
   switching between executing the first re-transmission mode and executing the second re-transmission mode,
   wherein the first and second re-transmission modes are physical layer re-transmission modes;
   wherein the first re-transmission mode is a parallel re-transmission mode.

2. A method according to claim 1 wherein the second re-transmission mode is a stop and wait (SAW) mode.

3. A method according to claim 2 wherein the SAW mode comprises:
   defining a plurality of re-transmit packets for a packet to be re-transmitted, each having different redundancies; and
   inserting the re-transmit packets one at a time into a normal packet flow in place of normal packets.

4. A method according to claim 2 further comprising:
   transmitting control information indicating for SAW mode which re-transmit packet is being transmitted.

5. A method according to claim 1 wherein a switch from the first mode to the second mode occurs after transmission of a predetermined number of first mode transmissions in respect of a given packet.

6. A method according to claim 1 wherein a switch from the first mode to the second mode occurs as a function of one or more system parameters.

7. A method according to claim 6 wherein the one or more system parameters comprise a receiver buffer occupancy by first mode content.

8. A method according to claim 7 wherein the switch from the first mode to the second mode occurs when the receiver buffer occupancy exceeds a threshold.

9. A method according to claim 1 wherein the parallel re-transmission mode comprises:
   defining at least one re-transmit packet for a packet to be re-transmitted;
   dividing each re-transmit packet into a respective plurality sub-packets;
   transmitting a subset of the sub-packets of one of the re-transmit packets using a transmission channel parallel to a normal packet flow.

10. A method according to claim 9 wherein the parallel re-transmission mode is a non-complete puncture (NCP) mode in which transmitting a subset of the sub-packets of one of the re-transmit packets using a transmission channel parallel to a normal packet flow comprises inserting the subset of the sub-packets of one of the re-transmit packets into one or more normal packets of a normal packet flow by puncturing the one or more normal packets with bits from the subset of sub-packets.

11. A method according to claim 10 wherein each re-transmit packet contains systematic content from an original packet with different redundancies.

12. A method according to claim 10 further comprising:
wherein for a given NCP transmission, the subset of sub-packets can have a variable size, the method further comprising transmitting control information indicating for NCP mode how many NCP sub-packets are in the subset.

13. A method according to claim 10 wherein the entire subset is punctured into a single normal packet.

14. A method according to claim 1 further comprising:
transmitting control information indicating which of the first re-transmission mode and second re-transmission mode is a current mode of operation of re-transmission.

15. A method according to claim 1 further comprising:
providing a first acknowledgement channel in respect of the first mode and a second acknowledgement channel in respect of the second mode.

16. A method according to claim 15 further comprising:
performing a switch between modes as a function of the first acknowledgement channel.

17. A method according to claim 15 wherein a switch between modes as a function of the first acknowledgement channel is performed after a predetermined number of negative acknowledgements are received in respect of first mode operation.

18. A method according to claim 15 further comprising:
performing a switch between modes as a function of the second acknowledgement channel.

19. A method according to claim 18 wherein a switch between modes as a function of the second acknowledgement channel is performed after a predetermined number of negative acknowledgements are received in respect of second mode operation.

20. A transmitter adapted to performing packet re-transmission by:
providing a first re-transmission mode and a second re-transmission mode; and
switching between executing the first re-transmission mode and executing the second re-transmission mode,
wherein the first and second re-transmission modes are physical layer re-transmission modes;
wherein the first re-transmission mode is a parallel retransmission mode.

21. A transmitter according to claim 20 wherein the second re-transmission mode is a stop and wait (SAW) mode.

22. A transmitter according to claim 20 wherein a switch from the first mode to the second mode occurs after transmission of a predetermined number of first mode transmissions in respect of a given packet.

23. A transmitter according to claim 20 wherein a switch from the first mode to the second mode occurs as a function of one or more system parameters.

24. A transmitter according to claim 23 wherein the one or more system parameters comprise a receiver buffer occupancy by first mode content.

25. A transmitter according to claim 20 wherein the SAW mode comprises:
defining a plurality of re-transmit packets for a packet to be re-transmitted, each having different redundancies; and
inserting the re-transmit packets one at a time into a normal packet flow in place of normal packets.

26. A transmitter according to claim 20 wherein the parallel re-transmission mode comprises:
defining at least one re-transmit packet for a packet to be re-transmitted;
dividing each re-transmit packet into a respective plurality sub-packets;
transmitting a subset of the sub-packets of one of the re-transmit packets using a transmission channel parallel to a normal packet flow.

27. A transmitter according to claim 26 wherein the parallel re-transmission mode is an NCP mode in which transmitting a subset of the sub-packets of one of the re-transmit packets using a transmission channel parallel to a normal packet flow comprises inserting the subset of the sub-packets of one of the re-transmit packets into one or more normal packets of a normal packet flow by puncturing the one or more normal packets with bits from the subset of sub-packets.

28. A transmitter according to claim 27 adapted to transmit control information indicating which of the first and second mode is a current mode of operation of re-transmission, and to transmit control information indicating for SAW mode which re-transmit packet is being transmitted.

29. A transmitter according to claim 20 further adapted to receive a first acknowledgement channel in respect of the first mode and a second acknowledgement channel in respect of the second mode.

30. A transmitter according to claim 29 further adapted to perform a switch between modes as a function of the first acknowledgement channel, the second acknowledgement channel, or a combination of the first acknowledgement channel and the second acknowledgement channel.

31. A packet re-transmission system comprising:
first re-transmission mode means providing a first parallel re-transmission mode;
second re-transmission mode means providing a second stop and wait re-transmission mode; and
mode switching means for switching between executing the first parallel re-transmission mode and executing the second stop and wait re-transmission mode,
wherein the first parallel re-transmission mode and second stop and wait re-transmission mode are physical layer re-transmission modes.

* * * * *

UNITED STATES PATENT AND TRADEMARK OFFICE
CERTIFICATE OF CORRECTION

PATENT NO. : 7,152,196 B2
APPLICATION NO. : 10/247286
DATED : December 19, 2006
INVENTOR(S) : Jianming Wu et al.

It is certified that error appears in the above-identified patent and that said Letters Patent is hereby corrected as shown below:

Column 1, line 37, "...ACK acknowledgement)..." should be -- ...ACK (acknowledgement)...--;

Column 6, line 50, "...19200X4..." should be -- ...19200 X 4...--;

Column 6, line 58, "...switch (can..." should be --...switch can...--;

Column 7, line 43, "...SPID=00..." should be --...SPID = 00...--;

Column 7, line 44, "...SPID=01..." should be --...SPID = 010...--;

Column 7, line 45, "...SPID=10..." should be --...SPID = 10...--;

Column 7, line 46, "...SPID=11..." should be --...SPID = 11...--;

Column 8, line 2, "...SPID=00..." should be --...SPID = 00...--;

Column 8, line 3, "...SPID=01..." should be --...SPID = 01...--;

Column 8, line 6, "...SPID=11..." should be --...SPID = 11...--;

Column 8, line 37, "...lumbers..." should be --...numbers...--;

Column 10, line 14, "...give n..." should be --...given...--;

Column 12, line 38, "...a split..." should be --...8 spilt...--;

Column 12, line 57, "...(SPID≠'00')..." should be --...(SPID ≠ '00')...--;

Column 13, line 13, "...at stop..." should be --...at step...--;

Column 14, line 5, "...($5N_{EJ'k}$), ... "should be --...($5N_{EPk}$), ...--;

Column 14, line 8, the word "Numerous..." should be the beginning of a new paragraph; and

UNITED STATES PATENT AND TRADEMARK OFFICE
CERTIFICATE OF CORRECTION

PATENT NO. : 7,152,196 B2
APPLICATION NO. : 10/247286
DATED : December 19, 2006
INVENTOR(S) : Jianming Wu et al.

It is certified that error appears in the above-identified patent and that said Letters Patent is hereby corrected as shown below:

Column 14, line 11, "...be practiced..." should be --...be practised...--.

Signed and Sealed this

Twenty-fourth Day of April, 2007

JON W. DUDAS
*Director of the United States Patent and Trademark Office*